July 21, 1970     E. C. KIEKHAEFER     3,521,501

STEERING CONTROL MEANS FOR WATERCRAFT

Filed Sept. 9, 1968     2 Sheets-Sheet 1

INVENTOR.
ELMER C. KIEKHAEFER
BY
Attorneys

July 21, 1970 E. C. KIEKHAEFER 3,521,501
STEERING CONTROL MEANS FOR WATERCRAFT
Filed Sept. 9, 1968 2 Sheets-Sheet 2
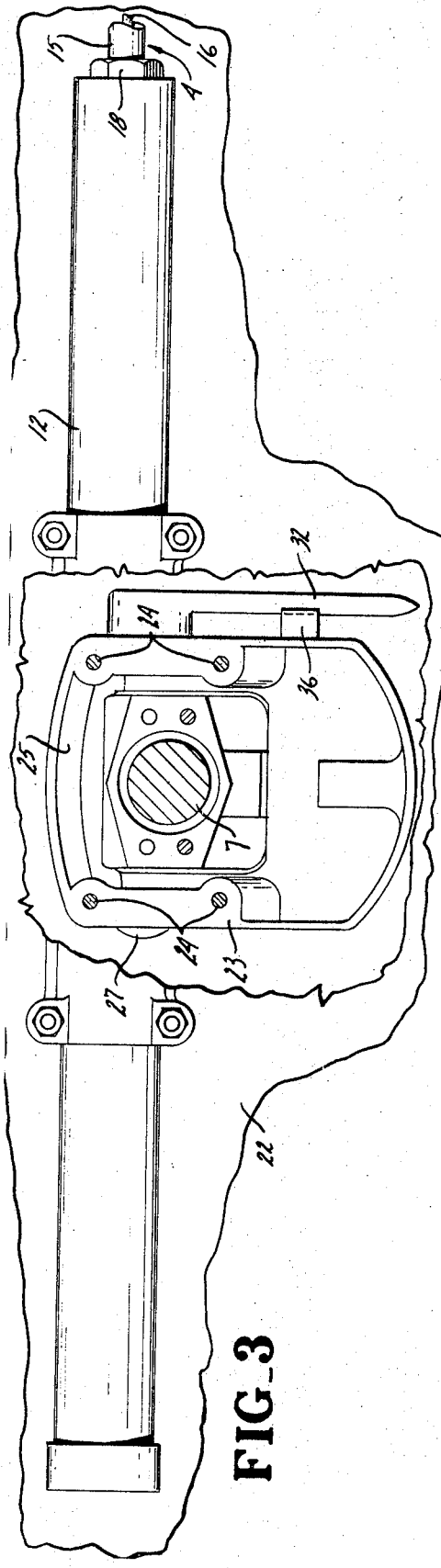
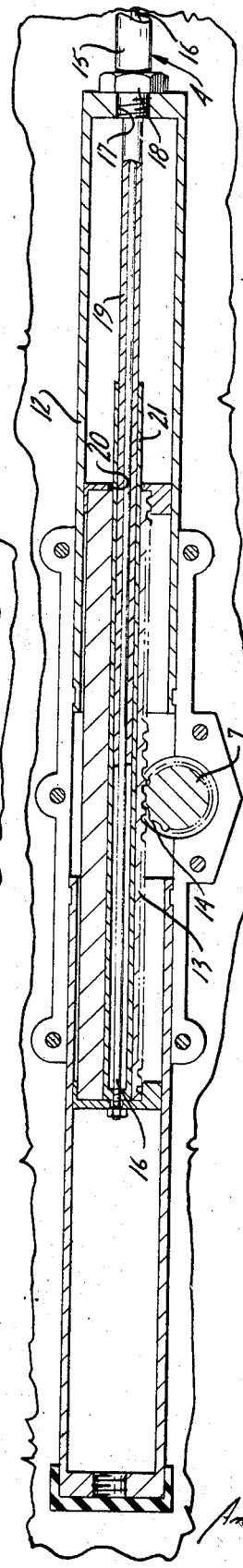
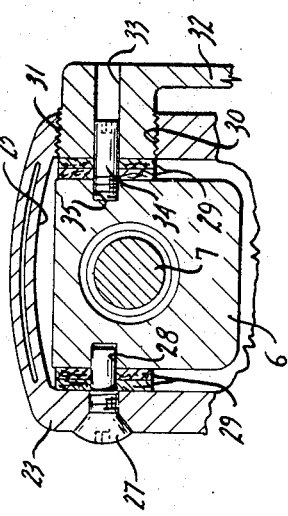
INVENTOR.
ELMER C. KIEKHAEFER
BY
Attorneys United States Patent Office 3,521,501
Patented July 21, 1970

3,521,501
STEERING CONTROL MEANS FOR
WATERCRAFT
Elmer C. Kiekhaefer, Winter Haven, Fla., assignor to
Brunswick Corporation, Chicago, Ill., a corporation of
Delaware
Filed Sept. 9, 1968, Ser. No. 758,347
Int. Cl. F16c 1/10; G05g 11/00
U.S. Cl. 74—480                                    3 Claims

ABSTRACT OF THE DISCLOSURE

The steering means for a watercraft is actuated for steering control of the watercraft by a remote steering control assembly which is vertically tiltable on a horizontal axis for adjustment within a given range. The steering control assembly includes a rack and pinion combination wherein the rack is connected to the outboard steering means by means of a push-pull cable. With vertical adjustment of the steering control assembly, the push-pull cable connection to the rack is not disturbed whereby the cable remains operably unaffected by any such adjustment.

---

This invention relates to steering control means for watercraft and more particularly to a tiltable steering control assembly in combination with a push-pull cable for directionally controlling the steering means of the watercraft.

Tiltable steering control assemblies for watercraft have been designed for use with tiller ropes. In the usual construction the tiltable steering control assembly would include a double-sheave winding drum on the end of the steering column opposite from the steering wheel. A tiller rope would be wound on each of the sheaves of the winding drum with the ropes wound in the opposite direction relative to each other. From the winding drum the respective ropes extend oppositely along the corresponding sides of the watercraft for connection to a control arm extending from the rudder means or steerable propulsion unit. With the ropes suitably taut, turning of the steering wheel will result in one rope playing out from its sheave while the other is wound onto its sheave to effect steering movement of the rudder means or steerable propulsion unit.

With the steering control assembly vertically tiltable about a transverse axis for adjustment, the winding drum for the tiller ropes moves correspondingly and the several tiller ropes are either tightened or slackened depending on the direction of tilt adjustment. If the ropes are properly taut in a given position and they become more taut with an adjustment of the steering control assembly, some bending is likely to occur to make turning of the steering wheel more difficult or perhaps even impossible. If as a result of steering control assembly adjustment the ropes are slackened, slippage results and the steering wheel may be rendered ineffective for steering. In any event tilt adjustment of the steering control assembly may also require tautness adjustment of the tiller ropes for proper operation of the steering control assembly. The time and effort expended making such a multiple adjustment tends to discourage making any adjustment at all and generally has the operator using the steering wheel in the attitude he finds it whether or not he finds it comfortable. It is generally an object of this invention, to provide the combination of a tiltable steering control assembly with a push-pull cable wherein upon adjustment of the control assembly the push-pull cable remains operably unaffected by any such adjustment.

According to the invention, the outboard steering means for a watercraft is controlled by an inboard steering control assembly pivotable within a given range about a horizontal axis for vertical adjustment. The steering control assembly includes a steering wheel which is rotatable to operate a pinion and rack combination. A push-pull cable is connected at one end to the rack and at the other end to the outboard steering means such that steering wheel manipulation actuates the rack and cable correspondingly to effect corresponding steering movement of the outboard steering means. With vertical adjustment of the steering control assembly, the push-pull cable connection to the rack is not disturbed whereby the cable remains operably unaffected by any such adjustment.

The drawings furnished herewith illustrate the best mode of carrying out the invention as presently contemplated and set forth hereinafter.

In the drawings:

FIG. 3 is a view taken generally on line 3—3 of FIG. 2 with parts broken away;

FIG. 4 is a sectional view taken generally on line 4—4 of FIG. 2; and

FIG. 5 is a sectional view taken generally on line 5—5 of FIG. 2.

Figure 1:
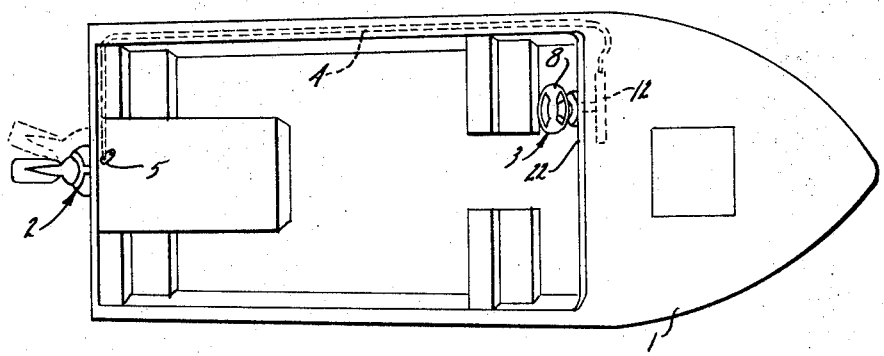
FIG. 1 is a plan view of a watercraft and shows the steering control means of this invention.
Figure 2:
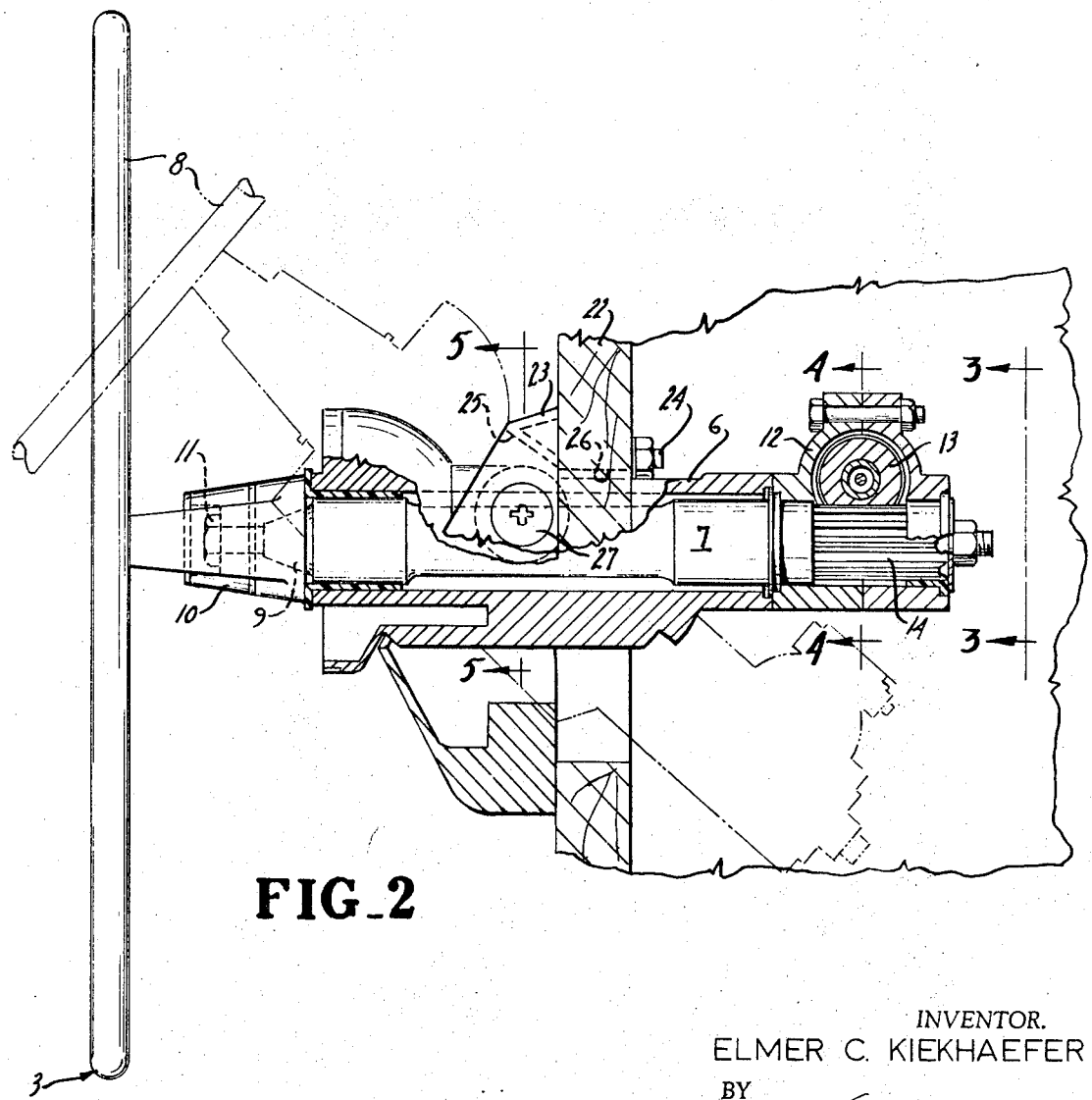
FIG. 2 is a side elevation of a tiltable steering assembly with parts broken away and sectioned, and in phantom lines shows another position for the assembly.

Referring to the drawings, the watercraft 1 is directionally controllable by steering means such as a marine propulsion unit 2 which is pivotally movable for steering in a generally horizontal plane about a generally vertical axis. Steering movement of the propulsion unit 2 is effected by the steering control assembly 3 mounted remotely in the watercraft 1 and connected by means of a flexible push-pull cable 4 to a control arm 5 on the propulsion unit.

The steering control assembly 3 includes the steering column 6 within which the steering shaft 7 is rotatably supported. A steering wheel 8 is provided on the end of the shaft 7 convenient to the operator of the watercraft. The steering wheel terminus of shaft 7 is provided with a square tapered axial projection 9 which is received within a corresponding recess in the hub 10 of the steering wheel 8 and a threaded member 11 extends axially through the hub and into the projection 9 whereby the steering wheel is rotationally locked and secured onto the shaft 7.

Oppositely from the steering wheel 8, the column 6 terminates with a tubular housing 12 which extends generally transversal of the watercraft and normal to the steering shaft 7. A rack member 13 is reciprocally disposed within the housing 12 and is movable in response to rotation of the pinion 14 meshingly engaged therewith and carried on the end of steering shaft 7.

The reciprocations of the rack member 13 in response to steering wheel movements is transmitted to the control arm 5 of the propulsion unit 2 by means of the flexible push-pull cable 4 which extends along the side of the watercraft and generally comprises an outer tubular casing sheath 15 within which a core wire 16 is confined for reciprocal movement. As perhaps best shown in FIG. 4, the sheath 15 at the control assembly end of cable 4 is threadedly engaged within the threaded opening 17 provided in the end of tubular housing 12 and is secured in place by the jam nut 18 while a rigid tubular guide extension 19 of the sheath extends into housing 12 and through an opening 20 into the interior of the hollow rack member 13. A rigid tubular member 21 is telescopingly disposed on the guide extension 19 of the sheath 15 and along with the core wire 16 is secured to the end of rack member 13 oppositely from the end opening 20. The assembly thus provides for corresponding telescoping movement of member 21 relative to the sheath extension 19 to similarly actuate the confined core wire 16 within the tubular sheath 15 with movement of the rack member 13.

The steering control assembly 3 is mounted on the dashboard 22 or other suitable support within the watercraft 1 and is adjustably movable in a generally vertical plane about a transverse axis. The assembly 3 is supported from a mounting bracket 23 secured to the dashboard 22 by a plurality of bolts 24. The mounting bracket 23 is provided with an opening 25 generally aligned with the opening 26 in the dashboard 22 and the aligned openings pivotally accommodate a corresponding portion of the steering column 6.

Pivotally adjustable movement for the steering control assembly 3 is provided by transversely spaced and aligned pin means extending between the mounting bracket 23 and the steering column 6. The pin means at one side of column 6 comprises a threaded member 27 which is engaged within a threaded opening in the mounting bracket 23. The threaded member 27 includes an unthreaded cylindrical lead portion which is received within a corresponding recess 28 in the steering column 6. A pair of friction washers are disposed around member 27 between the bracket 23 and the column 6 and the corresponding washer is preferably bonded to the bracket and column.

Aligned axially with threaded member 27 on the opposite side of steering column 6, the mounting bracket 23 is provided with an enlarged threaded opening 30 to receive the correspondingly threaded hub portion 31 of a lever 32 which is rotatable relative to the bracket in a generally vertical plane. The hub portion 31 of lever 32 is provided with a cylindrical opening 33 in axial alignment with threaded member 27. A pin member 34 is rotatably disposed in the opening 33 and is provided with a threaded lead portion which is engaged within the threaded opening 35 of the steering column 6. A pair of friction washers 29 are disposed around member 34 between the column 6 and the lever hub 31 and again are preferably bonded to the opposed parts.

As generally shown in FIG. 3, the steering column assembly 3 is in a given position of adjustment with the lever 32 releasably secured by a spring clip 36 or the like carried by the bracket 23. To reposition the assembly 3 and its steering wheel 8, the lever 32 is released from the clip 36 and pivoted upwardly whereby the lever hub 31 is somewhat unthreaded within the opening 30 and moved axially outward to relieve the holding pressure on the steering column 6. The assembly 3 and its steering wheel 8 are then free to be moved or adjusted in a vertical plane within the limits provided. After the steering wheel 8 is placed in the desired position, the lever 32 is pivoted downwardly to rethread the lever hub 31 into its opening 30 to reestablish the holding pressure on the friction washers 29 and resecure the assembly 3 in the new position. And the lever 32 is returned to the securement of the spring clip 36.

Regardless of the position of the control assembly 3 relative to its mounting, the steering wheel 8 remains operable to provide the desired steering control function.

As the assembly 3 is moved, the rack member 13 and its cable attachment move correspondingly. Operability of the push-pull cable 4 remains unaffected by slack or tension as may result from movement as the assembly 3 is repositioned.

Various modes of carrying out the invention are contemplated as being within the scope of the following claims particularly pointing out and distinctly claiming the subject matter which is regarded as the invention.

I claim:

1. In a steering control means for watercraft having outboard steering means and a dashboard or like support inboard and remote from said steering means; a steering control assembly mounted on the dashboard; said assembly being pivotable in a vertical plane to any desired position of adjustment within a given range and including a steering wheel, a pinion connected to the steering wheel and rotatable in response to steering wheel manipulation, and a reciprocating rack member meshing with the pinion; and a flexible push-pull cable connecting the rack member and the steering means; said steering means responding to steering wheel manipulation through said pinion, rack and cable in any position of steering control assembly adjustment as the push-pull cable remains operably unaffected by any such adjustment.

2. The invention as set forth in claim 1, wherein the flexible push-pull cable comprises a sheath member and a core member reciprocally movable relative to each other, one of said cable members being connected to the rack member for movement therewith relative to the other cable member in accordance with steering wheel manipulation.

3. In a steering control means for watercraft having an outboard steering member and a dashboard or like support inboard and remote from said steering member, a steering control assembly pivotally mounted on the dashboard and including a steering wheel, said assembly along with said wheel being pivotable in a vertical plane to any desired position of steering wheel adjustment within a given range, a flexible push-pull cable operatively connected at one end to the steering member, and transmission means connected to the opposite end of said cable from said steering member and in turn being operatively connected to said steering wheel, said transmission means being movable with said assembly for adjustment and responding to steering wheel manipulation to move the cable and steering member correspondingly with said cable being operatively unaffected by adjustment of the assembly.

References Cited

UNITED STATES PATENTS

| 3,135,130 | 6/1964 | Bentley | 74—480 XR |
| 3,157,060 | 11/1964 | Marr. | |
| 3,184,991 | 5/1965 | Bomberger | 74—480 XR |
| 3,206,998 | 9/1965 | Matz et al. | 74—494 |
| 3,208,300 | 9/1965 | Morse | 74—501 XR |
| 3,301,084 | 1/1967 | Boda | 74—501 XR |

MANUEL A. ANTONAKAS, Primary Examiner

U.S. Cl. X.R.

74—493, 501